United States Patent
Momen-Pour et al.

(10) Patent No.: US 7,698,257 B2
(45) Date of Patent: Apr. 13, 2010

(54) APPARATUS AND METHOD FOR RECURSIVELY RATIONALIZING DATA SOURCE QUERIES

(75) Inventors: Soroush Momen-Pour, Coquitlam (CA); Reuben Michael Arthur Cox, Vancouver (CA); Henrik Areskoug, Vancouver (CA); Ingo Hilgefort, Maple Ridge (CA)

(73) Assignee: Business Objects Software Ltd., Dublin (IE)

( * ) Notice: Subject to any disclaimer, the term of this patent is extended or adjusted under 35 U.S.C. 154(b) by 160 days.

(21) Appl. No.: 11/435,554

(22) Filed: May 16, 2006

(65) Prior Publication Data

US 2007/0271227 A1 Nov. 22, 2007

(51) Int. Cl.
G06F 17/30 (2006.01)
(52) U.S. Cl. ............... 707/3; 707/4; 707/100; 707/104.1
(58) Field of Classification Search ............ 707/1, 707/3, 4, 100, 104.1
See application file for complete search history.

(56) References Cited

U.S. PATENT DOCUMENTS

| | | | | |
|---|---|---|---|---|
| 6,134,541 A * | 10/2000 | Castelli et al. | ............ | 707/2 |
| 6,161,105 A * | 12/2000 | Keighan et al. | ............ | 707/100 |
| 6,405,208 B1 * | 6/2002 | Raghavan et al. | ............ | 707/102 |
| 7,133,865 B1 * | 11/2006 | Pedersen et al. | ............ | 707/3 |
| 7,233,940 B2 * | 6/2007 | Bamberger et al. | ............ | 707/3 |
| 7,333,982 B2 * | 2/2008 | Bakalash et al. | ............ | 707/5 |
| 7,363,287 B2 * | 4/2008 | Kilmer et al. | ............ | 707/2 |
| 7,392,248 B2 * | 6/2008 | Bakalash et al. | ............ | 707/5 |
| 2002/0178394 A1 * | 11/2002 | Bamberger et al. | ............ | 714/1 |
| 2003/0030672 A1 * | 2/2003 | Hughes et al. | ............ | 345/765 |
| 2003/0101170 A1 * | 5/2003 | Edelstein et al. | ............ | 707/3 |
| 2003/0115194 A1 * | 6/2003 | Pitts et al. | ............ | 707/3 |
| 2003/0225752 A1 * | 12/2003 | Bakalash et al. | ............ | 707/3 |
| 2004/0030685 A1 * | 2/2004 | Helles et al. | ............ | 707/3 |
| 2004/0039736 A1 * | 2/2004 | Kilmer et al. | ............ | 707/3 |
| 2004/0049505 A1 * | 3/2004 | Pennock | ............ | 707/5 |
| 2004/0068488 A1 * | 4/2004 | Dettinger et al. | ............ | 707/3 |
| 2004/0111421 A1 * | 6/2004 | Cohen et al. | ............ | 707/100 |
| 2005/0010565 A1 * | 1/2005 | Cushing et al. | ............ | 707/3 |
| 2005/0010566 A1 * | 1/2005 | Cushing et al. | ............ | 707/3 |
| 2005/0154714 A1 * | 7/2005 | Yu et al. | ............ | 707/3 |
| 2006/0010114 A1 * | 1/2006 | Dumitru et al. | ............ | 707/3 |
| 2006/0259509 A1 * | 11/2006 | Stolte et al. | ............ | 707/102 |
| 2006/0294087 A1 * | 12/2006 | Mordvinov | ............ | 707/4 |
| 2007/0038596 A1 * | 2/2007 | Pizzo et al. | ............ | 707/2 |
| 2007/0061305 A1 * | 3/2007 | Azizi | ............ | 707/3 |
| 2007/0118516 A1 * | 5/2007 | Li et al. | ............ | 707/4 |
| 2007/0208721 A1 * | 9/2007 | Zaman et al. | ............ | 707/4 |
| 2007/0226203 A1 * | 9/2007 | Adya et al. | ............ | 707/4 |

\* cited by examiner

*Primary Examiner*—Don Wong
*Assistant Examiner*—Thanh-Ha Dang
(74) *Attorney, Agent, or Firm*—Cooley Godward Kronish LLP (57) ABSTRACT

A computer readable medium stores executable instructions to receive a Multidimensional Expressions (MDX) query. The MDX query is recursively rationalized to form a rationalized query. The rationalized query is applied to a multidimensional data source to produce query results. The query results are returned.

12 Claims, 6 Drawing Sheets

APPARATUS AND METHOD FOR RECURSIVELY RATIONALIZING DATA SOURCE QUERIES

BRIEF DESCRIPTION OF THE INVENTION

This invention relates generally to querying data within data sources. More particularly, this invention relates an improved method and apparatus to retrieve data from a multi-dimensional data source.

BACKGROUND OF THE INVENTION

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information, content delivery infrastructure systems for delivery and management of reports and analytics, data warehousing systems for cleansing and consolidating information from disparate sources, and data management systems to collect, store, and manage raw data.

OLAP tools are a subset of business intelligence tools. There are a number of commercially available OLAP tools including Business Objects OLAP Intelligence™ which is available from Business Objects Americas of San Jose, Calif. OLAP tools are a report generation tool, and a tool suited to ad hoc analyses. OLAP generally refers to a technique of providing fast analysis of shared multi-dimensional information stored in a database. OLAP systems provide a multi-dimensional conceptual view of data, including full support for hierarchies and multiple hierarchies. This framework is used because it is a logical way to analyze businesses and organizations. In some OLAP tools the data is arranged in a schema which simulates a multidimensional schema. The multi-dimensional schema means redundant information is stored, but it allows for users to initiate queries without the need to know how the data is organized.

The querying process for OLAP can involve, depending on the specific implementation, writing and executing a query. Multidimensional Expressions (MDX) is a query language for OLAP databases, like SQL is a query language for relational databases. Thus, an MDX statement can be used to query for a result from an OLAP data source, i.e., a cube. The MDX statement can resemble SQL statements where one can ask for data on a row and columns from a cube. As with an SQL query, each MDX query requires a data request (the "SELECT" clause), a starting point (the "FROM" clause), and a filter (the "WHERE" clause). These and other keywords provide the tools used to extract specific portions of data from a cube for analysis, e.g., to extract a slice.

An MDX query specifies the appropriate columns and rows within the SELECT clause (the "ON COLUMNS" and "ON ROWS" clauses). For example, the MDX query can have the following format:

```
SELECT   Axis Dimensions Members   ON COLUMNS,
         Axis Dimensions Members   ON ROWS
FROM     Cube
WHERE    Sliced Dimensions Members
```

The "Axis Dimensions Members" specify which columns and rows to select. The "Sliced Dimensions Members" specify which slice of the cube to select.

Due to the nature of OLAP data sources, there is a lot of redundant data and a lot of columns and rows are selected in queries of even moderate complexity. In addition, users typically include many members in their queries. These factors lead to some MDX queries that are too long to be successfully executed by an OLAP server. Part of a multidimensional application, or an interface to a multidimensional data source, that communicates with the multidimensional data source maintains a sets of members that will be queried. This set is enumerable. When data associated with the list of members is needed a multidimensional query, such as an MDX statement, is constructed. Previously this query included an enumeration over a list. For example, a fragment of the MDX query could be:

SELECT {member1, member2, . . . member45312, . . . } ON COLUMNS

For a large list of members, the multidimensional query could be a very large statement. With some multidimensional data sources there can be a hard limit on the size of queries.

Therefore, it would be desirable to provide a new technique for reducing the size of queries to multidimensional data sources.

SUMMARY OF INVENTION

The invention includes a computer readable medium storing computer executable instructions to receive a multidimensional data source query. A recursive process is invoked to replace an element of the multidimensional data source query with a generator to create a rationalized query.

The invention also includes a computer implemented method that converts a plurality of objects, each object including metadata associated with a piece of data in a multidimensional data source, into a query to the multidimensional data source. The query is rationalized to create a rationalized query.

The invention also includes a computer readable medium that stores executable instructions to receive a Multidimensional Expressions (MDX) query. The MDX query is recursively rationalized to form a rationalized query. The rationalized query is applied to a multidimensional data source to produce query results. The query results are returned.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Various features associated with the operation of the present invention will now be set forth. Prior to such description, a glossary of terms used throughout this description is provided.

A descendent tree is a tree of members with a root member and two or more descendent members over two or more levels.

Except logic assumes it is more succinct to define a generator for what is to be excluded from a query rather than define what is to be included. Expect logic leads to the use of a generator for expect logic.

Family is a tree of members with a parent member and one or more children members. A two level case of a descendent tree.

Generator is an expression in a multidimensional query language that can generate a query for one or more members of a data source without explicit specification of the one or more members. Thus, a generator is a generalized expression of specific data source elements. The generators can be for a hierarchy, a level, a family, a descendent tree, or for except logic. For MDX the generator include the following: "Hierarchy.Members" as a generator to a hierarchy, "Level.Members" as a generator to a level, "Member.Children" as a generator to a family, and "Descendants(Member, Level, Self)" as a generator to a descendant tree. For MDX the Except logic generator is "Except(x, y)", where x, y are lists of members, or generators to families, or descendent trees. Here x is the generator to members to be included, and y is the generator to members to be excluded.

Hierarchy is a set of hierarchically related data in a multi-dimensional data source, e.g., a cube.

Level is a level in a hierarchy. Usually a level is a set of members in the hierarchy at an equal depth from a root member of the hierarchy.

Member is an element of data in a dimension hierarchy.

Multidimensional Expressions (MDX) is a query language for multidimensional data sources, such as an OLAP database. The query language is an analogue to the structured query language (SQL) query language for relational databases.

Rationalization is the process of simplifying a query, for example, by replacing one or more members in a query with one or more generators. Rationalization reduces the size of the query.

Figure 1:
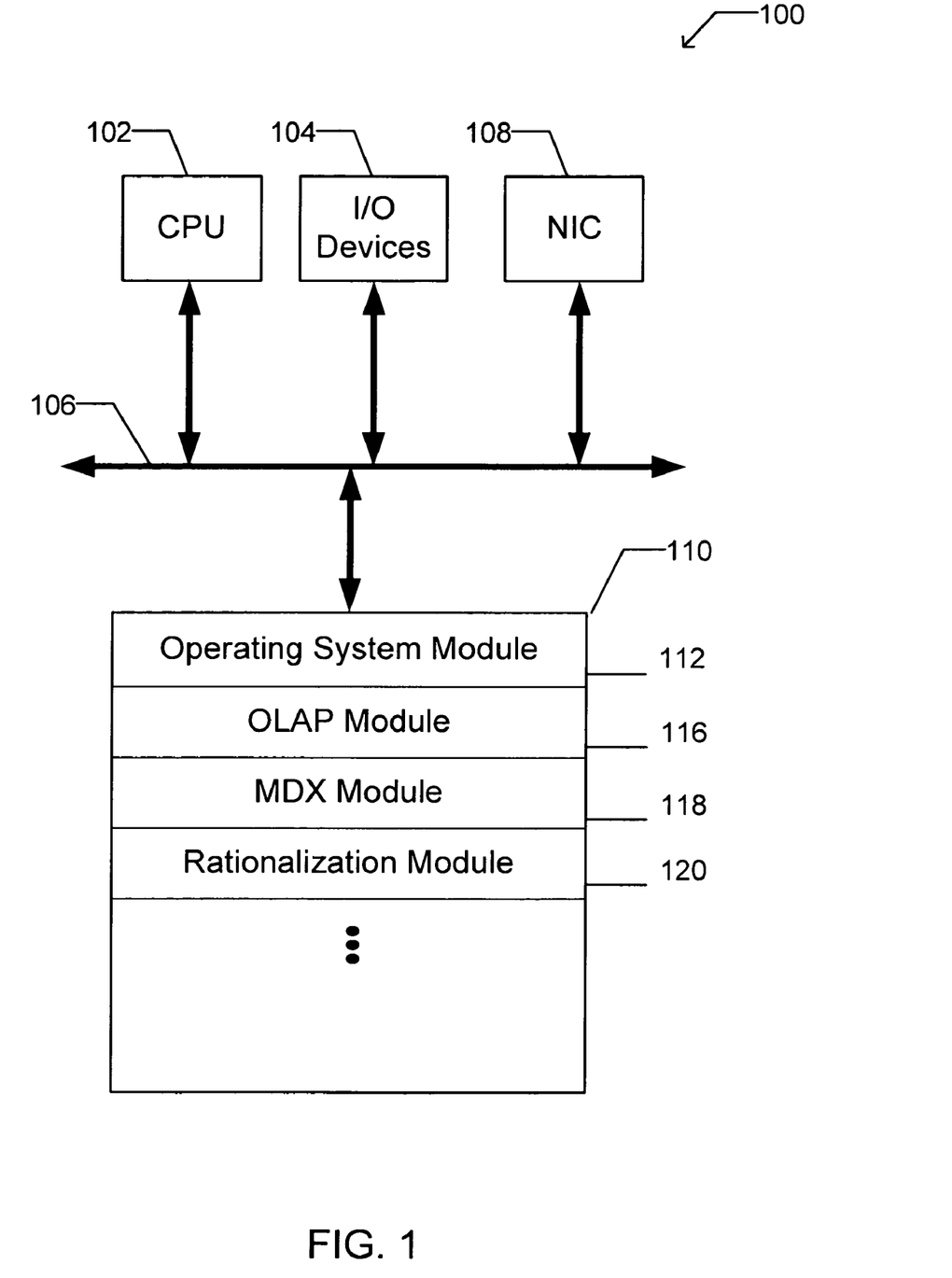
FIG. 1 illustrates a computer constructed in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network interface circuit 108 is also connected to the bus 106. The network interface circuit 108 provides connectivity to a network (not shown), thereby allowing the computer 100 to operate in a networked environment.

A memory 110 is also connected to the bus 106. In an embodiment the memory 110 stores one or more of the following modules: an operating system module 112, an OLAP module 116, an MDX module 118, and a Rationalization module 120.

The operating system module 112 may include instructions for handling various system services, such as file services or for performing hardware dependant tasks. The OLAP module 116 includes executable instructions for interfacing with an OLAP data source, such as, an OLAP cube (not shown). The OLAP module 116 can include executable instructions to allow computer 100 to access any OLAP data source, such as, an application program interface, to a specific types, version, or format of a data source. The MDX module 118 includes executable instructions to create an MDX query to an OLAP data source.

The rationalization module 120 includes executable instructions to rationalize an MDX query. The executable instructions try to find patterns in the query and replace the pattern with an appropriate pattern generator. In an embodiment, the rationalization module 120 compresses the expression for the axis dimensions members for the ON COLUMNS/ROWS clauses.

The executable modules stored in memory 110 are exemplary. Additional modules, such as a graphical user interface module, can be added. It should be appreciated that the functions of the modules maybe combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
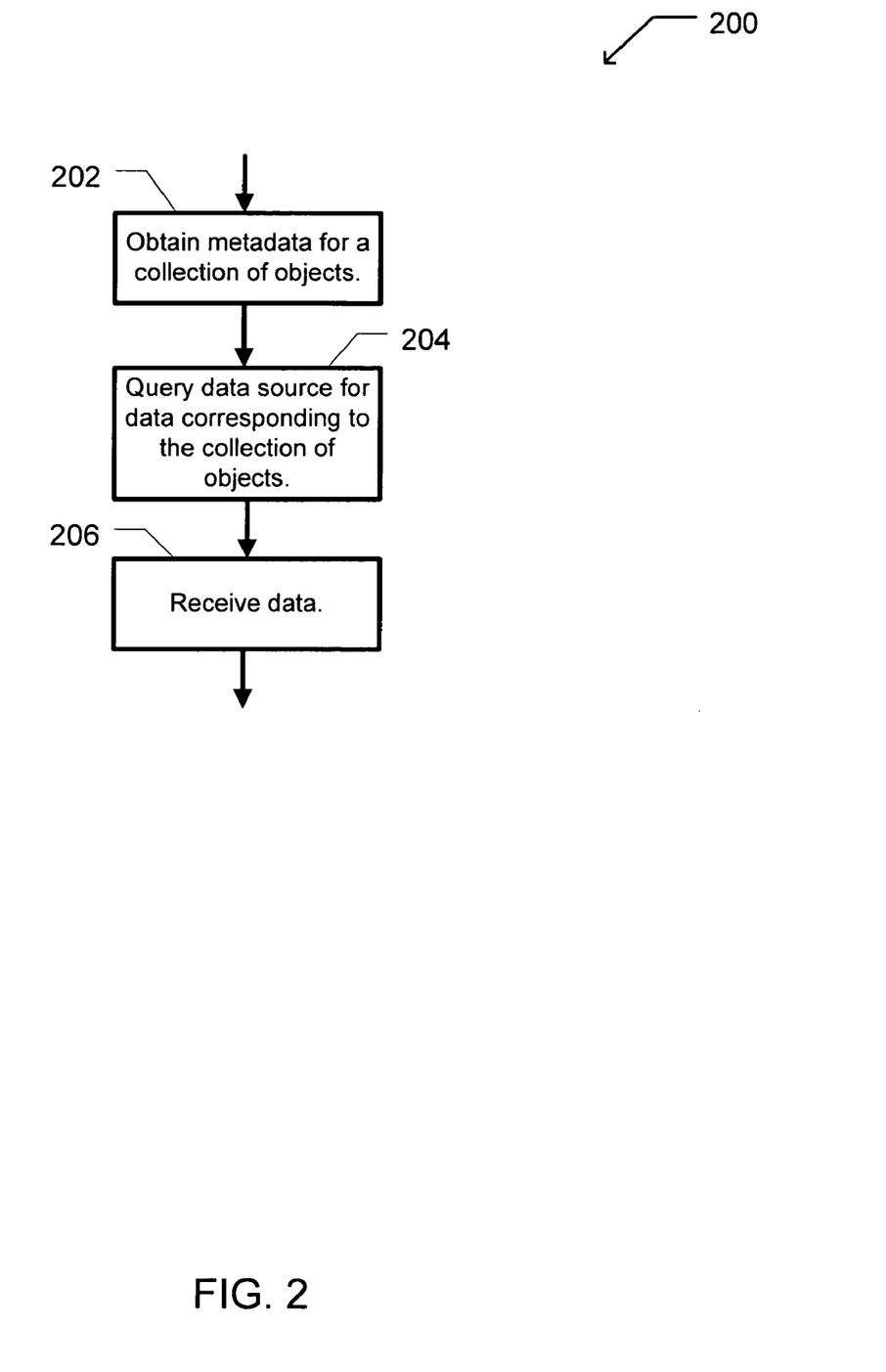
FIG. 2 illustrates processing operations associated with an embodiment of the invention.

FIG. 2 illustrates processing operations 200 that a user may execute on computer 100. In the first processing operation of FIG. 2, the user obtains some metadata data about a collection of objects, 202. The metadata includes sufficient information to query the multidimensional data source for the data.

In processing operation 204 the user queries a data source for the data corresponding to the collection of objects. In this processing operation the query uses the metadata for the collection of objects. In processing operation 206 the user obtains the data.

Figure 3:
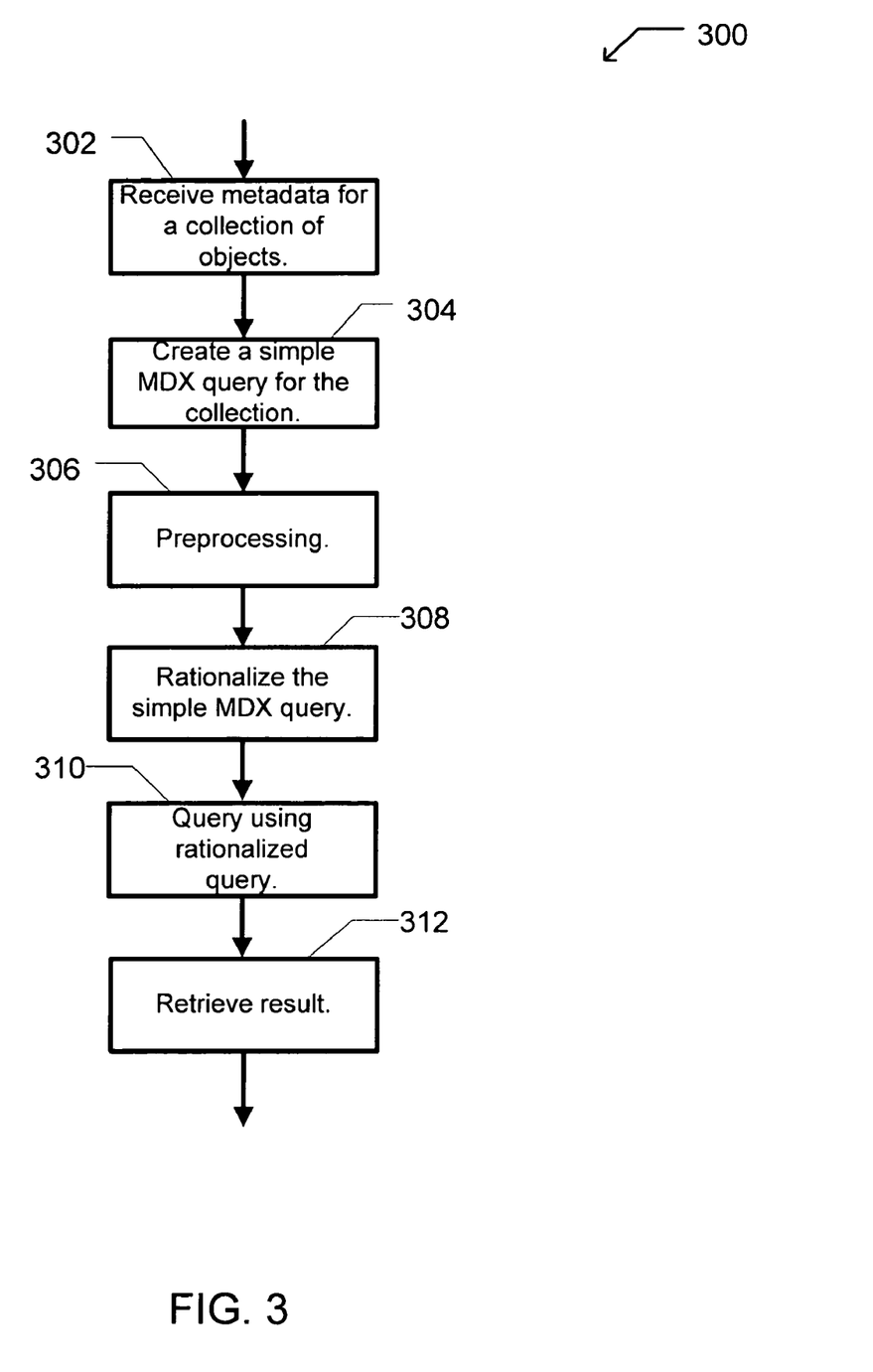
FIG. 3 illustrates processing operations associated with an embodiment of the invention.

FIG. 3 illustrates a series of processing operations 300 which may be used to service the requests made of computer 100 in the processing operations of FIG. 2. In the first processing operation of FIG. 3, metadata data for a collection of objects is received 302 (e.g., at computer 100).

In processing operation 304, computer 100 creates a simple MDX query. In an embodiment, the simple MDX query includes a list of objects from the collection of objects. The size of the query is proportional to the number of objects in the collection.

In processing operation 306, the simple MDX query is preprocessed for rationalization. A preprocessing operation includes merging or splitting MDX queries. In processing operation 308 the simple MDX query is rationalized. In an embodiment of the invention rationalization includes one or more invocations of a recursive rationalization process.

In processing operation 310 the computer 100 uses the rationalized query to query the data source. The query is serviced in accordance with standard methods used with multidimensional data sources.

The results of the query can be ordered. In an embodiment, the ordering is performed by a multidimensional server, i.e., not computer 100. In an embodiment, the ordering of the results of the query involves placing the results in order of a depth-first search of the hierarchy from with the result came. A depth-first search is a method for traversing a tree by starting at the root and exploring as far as possible along each branch before backtracking. Other orderings to make the results logical to the user are also possible. These include breadth-first, alphabetical, and the like. In an embodiment, the MDX command hierarchy can be sent to the multidimensional server along with the rationalized query. The results of the query are then received 312.

Figure 4:
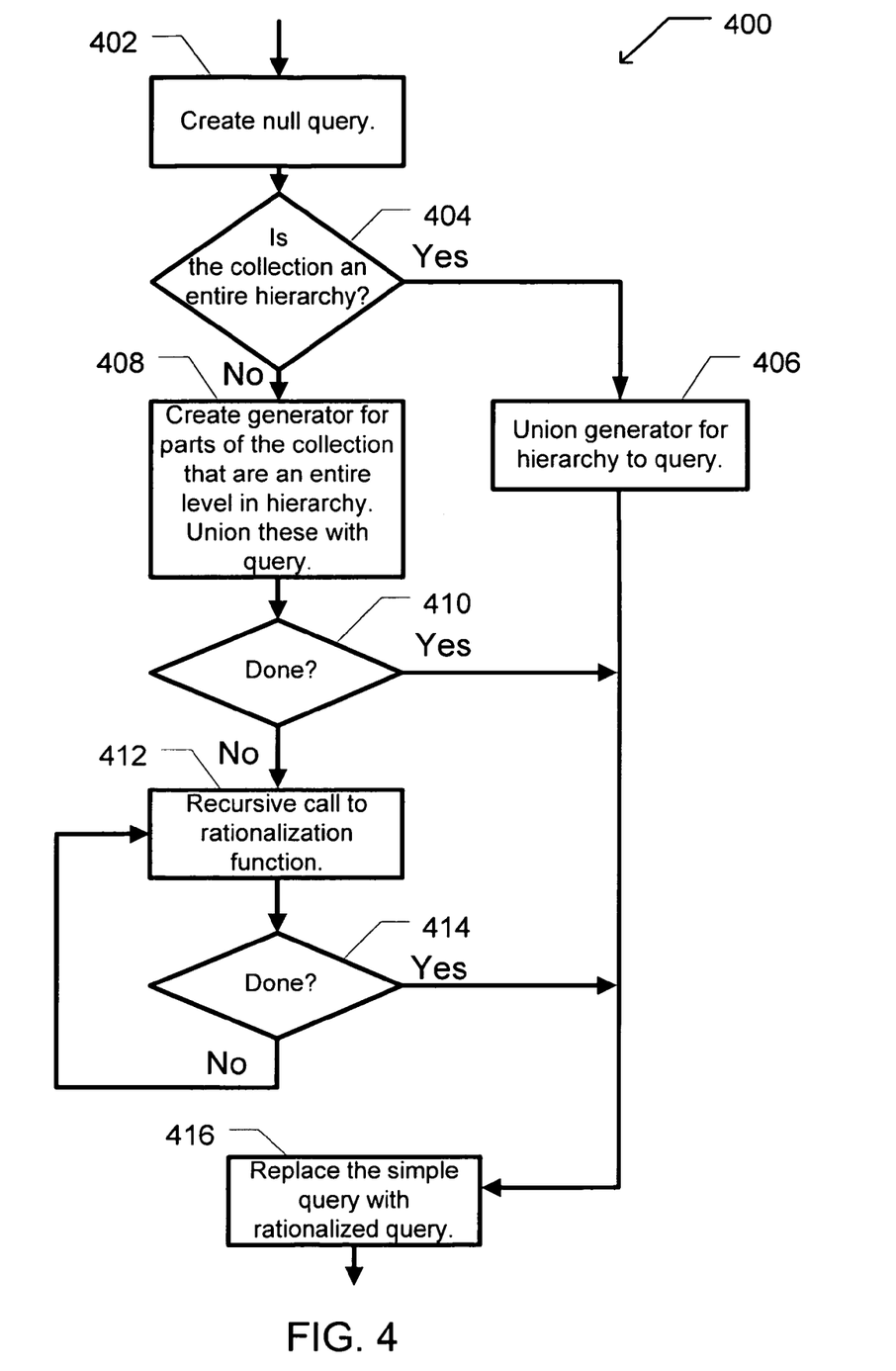
FIG. 4 illustrates processing operations implementing an operation from FIG. 3.

FIG. 4 illustrates a series of processing operations 400 used to rationalize a multi-dimension query. In the first processing operation of FIG. 4, a null query is created as the rationalized query, 402. This null query will be augmented in subsequent processing operations.

Next a comparison is made between the collection of objects and the hierarchy of the data source 404. If the collection of objects overlaps with the hierarchy, 404—Yes, the collection of objects can be represented by a generator that specifies the hierarchy. For example, if the collection is all customers in North America, and the hierarchy is the customers by city, state/province, and country, the generator for the query could be "NorthAmericaCustomers.Members". That is specifying a hierarchy for the North American customers and all members. This generator is combined with the rationalized query 406.

Typically, the collection of objects and the hierarchy do not overlap, 404—No. In which case, a comparison is made between the collection of objects and the various levels of the hierarchy, 408. If part of the collection of objects is an entire level in a hierarchy, then that part of the collection can be concisely expressed. In an embodiment, the computer 100 compares the objects in the collection to the data at each level in the hierarchy. Once a generator is formed for the objects that span an entire level, the objects are removed from the simple query and the generator is combined with the rationalized query.

If no more objects are to be processed (410—Yes), the rationalization is complete and processing proceeds to operation 416. If processing is not completed (410—No), a first call is made to a recursive process that rationalizes the query, 412. The parameters passed to the rationalization process are the simple query, the rationalized query as it its, an iteration index, and other parameters. The process is recursive and if after one call the rationalization is not complete the recursive process invokes another instance of itself with updated parameters. This shown in FIG. 4 as block 414. A recursive call is 414—No, and the end of the recursive calls is 414—Yes. In an embodiment, the recursive call is predicated on whether further rationalization can be expected to yield results. In another embodiment, the invocation is subject to other constraints, e.g., elapsed time of processing operations 400.

The following code segment is pseudo code that invokes the non-recursive processing operations from FIG. 4, and describes code similar to code included in the rationalization module 120 from FIG. 1.

```
                 Rationalize Query

AA    ...
AB    Rationalized Query = " "
AC    if( Number of Member(Simple Query) = = Number
          of Member(Hierarchy) )
AD        Rationalized Query = "Heirachy.members( )"
AE        Simple Query = Simple Query – members(Heirachy)
AF        Exit Rationalization
AG    else foreach Level in Hierarchy; incrementing by level from first
          to last level
AH        Intersecting Set = intersection(Hierarchy, Simple Query)
AI        if(Number of Member(Intersecting Set) = = Number of
              Members(Level))
AJ            Rationalized Query = Rationalized Query +
                                        "Heirachy.level(Level)"
AK            Simple Query = Simple Query – members at level(Level)
AL            if( Number of Member(Simple Query) = = 0 )
AM                Exit Rationalization
AN            end-if
AO        end-if
AP    end-foreach
AQ    else call Recursive Rationalization Process (Simple Query,
                                      Rationalized Query,
                                      Iteration Index = 0, . . . )
AR    Exit Rationalization
```

In this segment, the pseudo code at lines AB-AE is an implementation guide to processing operations 404 and 406. If the "Simple Query", i.e., a collection of objects, has the same number of objects as the hierarchy, then the rationalized query is the generator for all objects in the hierarchy. The pseudo code at lines AG-AK is an implementation of processing operations 408 and 410. The foreach loop is over the levels in the hierarchy. If the intersection of the level and the collection has the same number of objects as the level, the level is removed from collection and a generator for the level is added to the rationalized query. If the processes described in lines AB-AE and AG-AK removes all the objects in the simple query the rationalization process ends, see lines AF and AL-AN. Otherwise at line AQ, a first call is made to the recursive rationalization process.

The following code segment is pseudo code that invokes the recursive processing operations from FIG. 4, and describes code similar to code included in the rationalization module 120 from FIG. 1.

```
             Recursive Rationalization Process (Members,
                              RationalizedQuery,
                              IterationIndex, . . . )
BA    threshold = 0.5
BB    MembersToAddNow = MembersToAddLater = Null;
BC    create map Map(object:(integer, one or more objects)
BD    foreach Object in the Members
BE        if(parent(Object) = Null)
BF                MembersToAddNow += Object
BG        end-if
BH        if( ! parent(object) in map)
BI            Map[parent(Object)].mapPart(1) = numberOfChildren(parent(Object))
BJ            Map[parent(Object)].mapPart(2) = Children(parent(Object))
BK        else
BL            Map[parent(Object)].mapPart(2) += Object
BM        end-if
BN    end-foreach
BO    foreach Key in the Map
BP        if( number(Map[Key].mapPart(2)) = = Map[Key].mapPart(1) )
BQ            MembersToAddLater += Key
BR        elseif (Map[Key].mapPart(1) – number(Map[Key].mapPart(2)) <
                                Map[Key].mapPart(1) * threshold)
BS            ExceptList = children(Key) – Map[Key].mapPart(2)
```

```
                            -continued
BT              if( IterationIndex = = 0)
BU                  RationalizedQuery += "Except(Key, ExceptList)"
BV              elseif( IterationIndex = = 1)
BW                  Decendents = Null
BX                  foreach Object in ExceptList
BY                      Decendents += (nameOfObject(Object + ".children()")
BZ                  end foreach
BAA                 RationalizedQuery += "Except(Key, Decendents)"
BAB             else
BAC                 Decendents = Null
BAD                 foreach object in ExceptList
BAE                     Decendents += "descendents(nameOfObject(Object),
BAF                         level(depth(key) + IterationIndex + 1), self)"
BAG                 end foreach
BAH                 RationalizedQuery += "Except(Key, Decendents)"
BAI             end-if
BAJ         else
BAK             MembersToAddNow += Map[Key].mapPart(2);
BAL end-foreach
BAM updateRationalizedQueryNow(MembersToAddNow, RationalizedQuery,
                                    IterationIndex)
BAN if(MembersToAddLater != Null)
BAO         Recursive Rationalization Process (MembersToAddLater,
                        RationalizedQuery,
                        IterationIndex + 1, . . . )
BAP     end-if
```

In this segment, the pseudo code at lines BA and BB set a threshold and two lists are created. The first list, "MembersToAddNow", includes members to be added at the end of this instance of the recursive process. The second list, "MembersToAddLater", includes members to be added in a later instance of the recursive process. In lines BC-BI a map from parent objects to child objects in the "Members", and the number of children it has in the hierarchy, is created and populated. In populating the map, the root member is automatically added, see lines BE-BG. Also in populating the map, each parent not in the map is mapped to its maximum number of children. See, "mapPart(1)" on line BI. Then the parents are mapped to children in the simple query. See, "mapPart(2)" on line BI. Members that are children of previously added members are added to the map at line BL In lines BO-BAL each object in the map is visited by iterating over the key to the map, "Key". If for the Key, which is a parent, the number of its children equals the maximum number of children for the parent, then this represents a complete family for which a generator can be created. See lines BP and BQ. The key is added to the members to be added later list since itself may be part of a greater pattern identified in a later instance of the recursive process.

Otherwise, at line BR, if less than all the children present in the family, but more than an amount determined by the "threshold" value are present except logic is employed. First, the list of members to exclude is created, line BS. Line BU is executed if the iteration index is 0, meaning the process is examining leaf members and a member one level up in a tree. The members to be excluded are appended to the rationalized query with the appropriate generator for except logic. Lines BW-BAA are executed if the iteration index is 1. A list of descendents to exclude is created and appended to the rationalized query. Lines BAC-BAH are executed if the iteration index is 2 or more. A list of descendents to exclude on a particular level is created. The level name is supplied by function "level". The list, with the appropriate except generator, is appended to the rationalized query.

Otherwise, at line BAK, the members that are children of the parent Key are sparse and they are added to the "to be added now" list. The for-loop over the map ends at line BAL.

At line BAM, the rationalized query is updated from the "MembersToAddNow" list. This is described below. Finally if the "MembersToAddLater" is not null, another instance of the recursive rationalization process is invoked. Unlike the first invocation the "MembersToAddLater" replace "SimpleQuery" as the members variable. The iteration index is incremented.

The following code segment is pseudo code that defines the updateRationalizedQueryNow function invoked above.

```
updateRationalizedQueryNow( MembersToAddNow, RationalizedQuery,
                            IterationIndex)
CA      if( IterationIndex = = 0)
CB          foreach Object in MembersToAddNow
CC              RationalizedQuery += "nameOfObject(Object)"
CD          end-foreach
CE      elseif( IterationIndex = = 1)
CF          foreach Object in MembersToAddNow
CG              RationalizedQuery +=
                    "nameOfObject(Object) + .children"
CH          end-foreach
CI      else
CJ          foreach member in MembersToAddNow
CK              RationalizedQuery +=
                    "decendents(nameOfObject(Object),
                        level(IterationIndex + depth(Object)), self)"
CL          end-foreach
CM      end-if
```

In this segment, the pseudo code at lines CA-CD updates the rationalized query from the "MembersToAddNow" list for iteration 0. The same is done for iterations 1, and 2 or more at lines CF-CH and CK-CL. In updating the rationalized query the quotation marks are used to denote that an MDX statement, a string, is being created. Data structures other than strings are possible. The MDX statements can include relative or absolute names depending on the implementation.

Figure 5A:
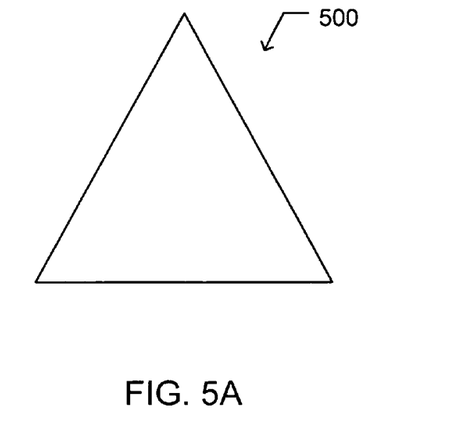
FIGS. 5A, 5B, 5C, and 5D illustrate a series of schema for a plurality of hierarchies.
Figure 5B:
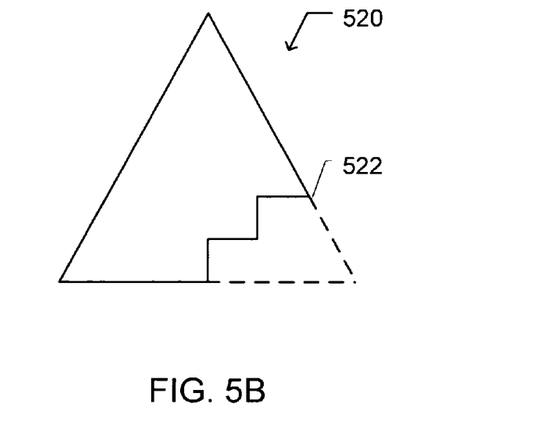
Figure 5C:
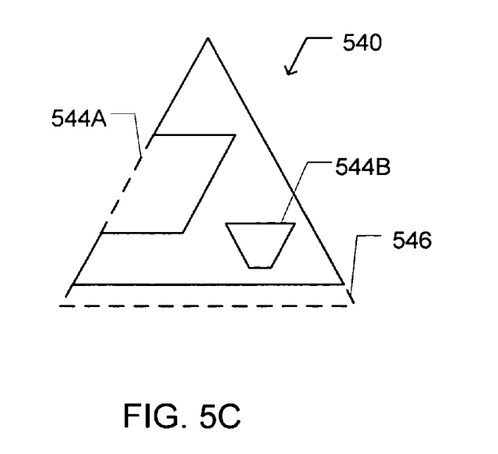
Figure 5D:
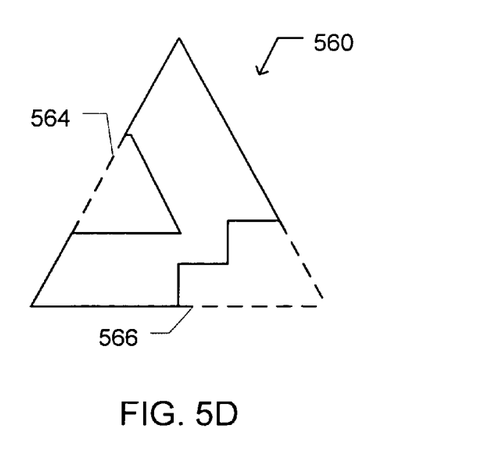

Embodiments of the present invention can rationalize queries that have multiple defects. A defect causes the query to be unsymmetrical. FIG. 5A illustrates a schema for a balanced query 500 to a hierarchy. A balanced query exhibits one form of symmetry: right-left symmetry. FIG. 5B illustrates a schema for an unbalanced query 520, with missing portion 522. FIG. 5C illustrates a schema for a query 540 that is ragged and short. With respect to its ragged aspect, query 540 has portions of intermediate levels removed, 544A and 544B. Query 540 is short because the desired data does not include the terminal nodes at the bottom of the hierarchy, 546. A ragged or short query lacks translational symmetry. FIG. 5D illustrates a schema for query 560 that has multiple defects with missing portions 564 and 566.

Figure 6:
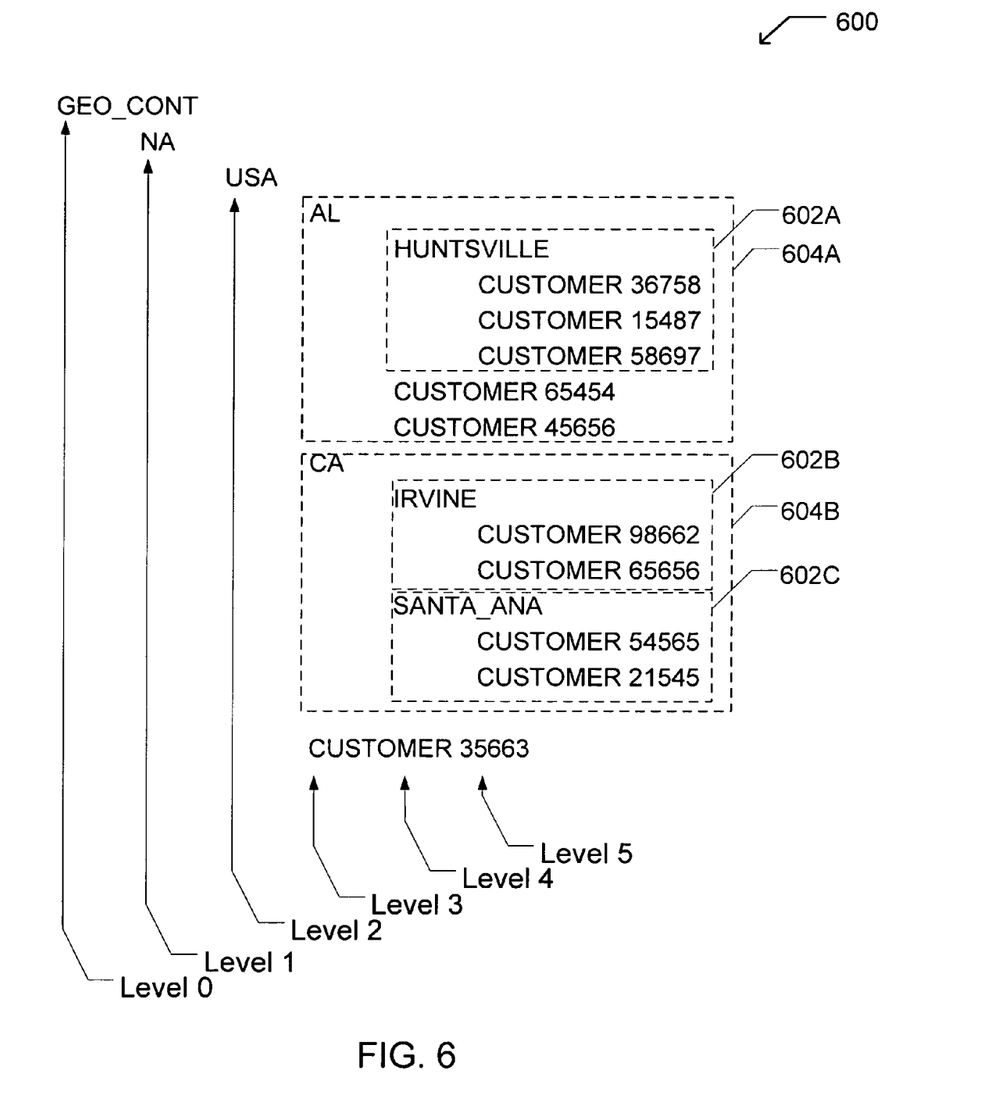
FIG. 6 illustrates an example of a collection of objects.

FIG. 6 illustrates a collection of members in a geographic hierarchy 600. The objects in the collection correspond to:

| CUSTOMER | 36578, | CUSTOMER | 15487, | CUSTOMER | 58697, |
|----------|--------|----------|--------|----------|--------|
| CUSTOMER | 65454, | CUSTOMER | 45656, | CUSTOMER | 98662, |
| CUSTOMER | 65656, | CUSTOMER | 54565, | CUSTOMER | 21545, |
| CUSTOMER | 35663  |          |        |          |        |

The simple query to the data source would recite each of these objects.

After a first invocation of the recursive rationalization process, the rationalized query replaces clusters of parents and children with a generator to the same. The parents and children in clusters 602A, 602B, and 602C are replaced with generators "HUNTSVILLE.CHILDREN", "IRVINE.CHILDREN", and "SANTA_ANA.CHILDREN". Except logic is applied to replace the customers in clusters 604A with "EXCEPT(AL.CHILDREN, {HUNTSVILLE})". Only "CUSTOMER 35663" remains in the simple query. The remaining elements of the simple query can be with the rationalized query for the purposes of making a query to a data source. Otherwise, another call to the recursive process is made.

After a second invocation the rationalized query is reduced to:

HUNTSVILLE.CHILDREN, EXCEPT(AL.CHILDREN, {HUNTSVILLE}),

DESCENDANTS(CA, LEVEL 5, SELF), CUSTOMER 35663

Here "IRVINE.CHILDREN", and "SANTA_ANA.CHILDREN" have been replaced with a generator to the descendants of CA, "DESCENDANTS(CA, LEVEL 5, SELF)" specifying the level "5" and that only the descendents at level 5 be included (parameter "SELF").

In accordance with an aspect of the invention, as the size of the simply query grows the relative size of the rationalized query decreases. In other words, the savings in query length increases. In the above example, a query that was 139 characters in length is now 92. In other examples employing embodiments of the invention, simple queries of about 2 megabytes and 4.6 kilobytes were reduced to rationalized queries of about 5 kilobytes and 0.6 kilobytes, respectively. Some multidimensional programs limit the size of queries, e.g., a 64 kilobyte limit. Some multidimensional programs have large identifiers for objects, which automatically leads to large queries. In some cases, the shorter multidimensional query increases the performance of queries to the multidimensional data source.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable medium storing computer executable instructions, which when executed by a computer cause the computer to:
   receive a multidimensional data source query specifying data source elements;
   construct a generator representing a generalized expression of one or more of the data source elements of the multidimensional data source query; and
   invoke a recursive process to replace at least one of the data source elements of he multidimensional data source query with the generator to create a simplified query of reduced size for application to a data source, wherein the generator represents the generalized expression of one or more of the data source elements without an explicit specification of one or more of the data source elements, and wherein the generator is a collection of objects specifying a hierarchy, a level, a family, a descendent tree or except logic.

2. The computer readable medium of claim 1 further comprising executable instructions to return data associated with the simplified query.

3. The computer readable medium of claim 1 wherein the recursive process replaces a plurality of elements of the multidimensional data source query with one or more generators.

4. The computer readable medium of claim 1 further comprising executable instructions to replace a family of elements in the multidimensional data source query with a generator associated with the family, wherein the family includes a parent and a plurality of children.

5. The computer readable medium claim 1 further comprising executable instructions to replace a descendent tree of elements in the multidimensional data source query with a generator corresponding to the descendent tree, wherein the descendent tree includes a root and a plurality of descendents on one or more levels.

6. The computer readable medium of claim 1 further comprising executable instructions to convert a collection of objects referencing data in a multidimensional data source into the multidimensional data source query.

7. The computer readable medium of claim 1 wherein a multidimensional data source is an OLAP data source and the simplified query is in Multidimensional Expressions (MDX).

8. The computer readable medium of claim 1 further comprising executable instructions to query a multidimensional data source with the simplified query.

9. The computer readable medium of claim 8 further comprising executable instructions to order results of the query to the multidimensional data source.

10. The computer readable medium of claim 1 further comprising executable instructions to:
   remove one or more elements from the multidimensional data source query by replacing the one or more elements with a new generator defining a plurality of members to be excluded from the simplified query and wherein the new generator is a generator for except logic.

11. A computer readable medium storing computer executable instructions, which when executed by a computer cause the computer to:
   receive a Multidimensional Expressions (MDX) query specifying data source elements;
   construct a generator representing a generalized expression of one or more of the data source elements of the MDX query;
   recursively simplify the MDX query to form a simplified query of reduced size by replacing at least one of the data source elements of the MDX query with the generator, wherein the generator represents the generalized expression of one or more of the data source elements without an explicit specification of one or more of the data source elements, and wherein the generator is a collection of objects specifying a hierarchy, a level, a family, a descendent tree or except logic;
   apply the simplified query to the multidimensional data source to produce query results; and
   return the query results.

12. The computer readable medium claim 11 further comprising executable instructions to order the query results.

* * * * *